Jan. 13, 1953  G. D. SHECKELS  2,625,673
MOTOR CONTROL SYSTEM
Filed Feb. 21, 1946
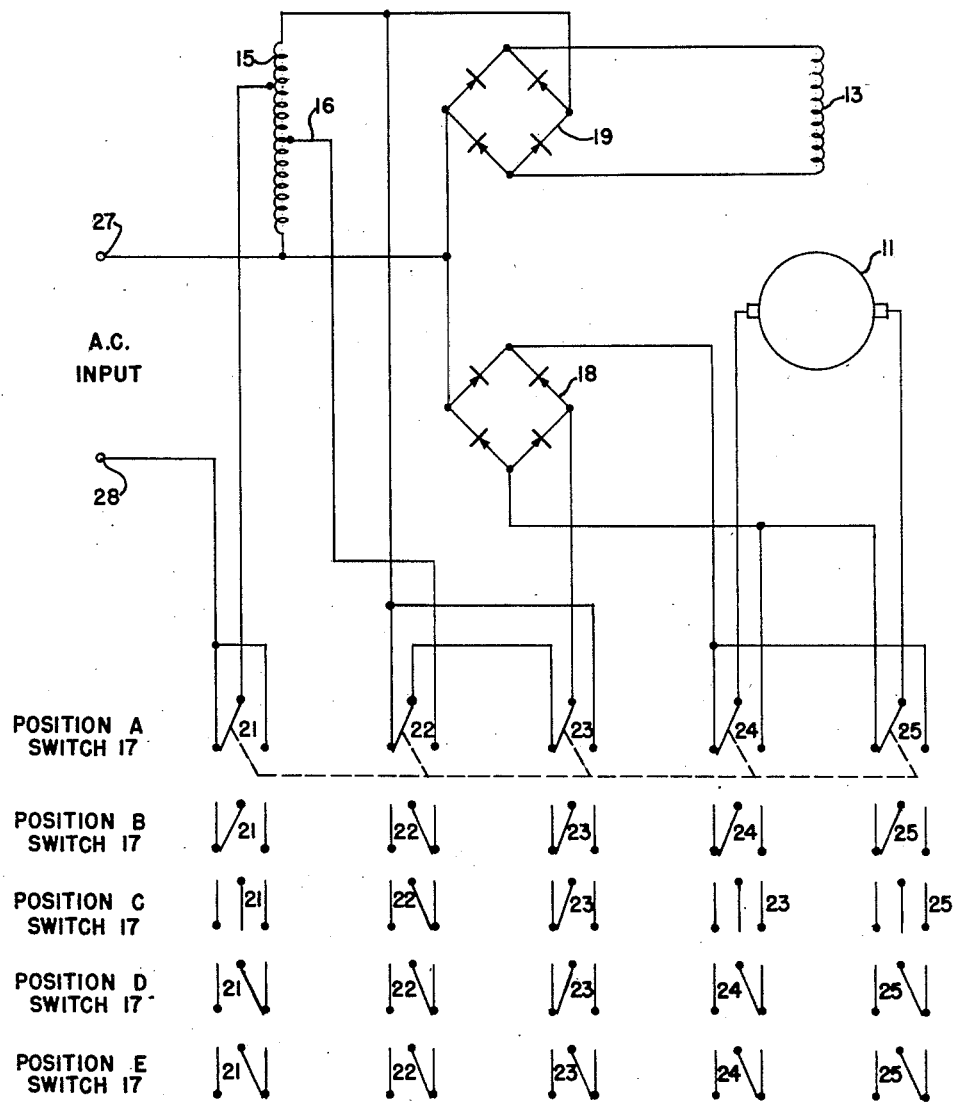
INVENTOR
GLENN DALE SHECKELS
BY  *M. C. Hayes*
ATTORNEY Patented Jan. 13, 1953

2,625,673

UNITED STATES PATENT OFFICE 2,625,673

MOTOR CONTROL SYSTEM

Glenn D. Sheckels, Bozeman, Mont., assignor, by mesne assignments, to the United States of America as represented by the Secretary of the Navy Application February 21, 1946, Serial No. 649,420

8 Claims. (Cl. 318—257)

This invention relates to control systems and more particularly to simple, light weight, electric motor control systems.

Heretofore electric motor control systems which permitted sufficient torque and flexibility from the motor, as used to drive a radar antenna or spinner, have been complex and bulky, and those which were small and/or simple permitted insufficient torque and/or flexibility.

A primary object of the present invention is to generally improve electric motor control systems by eliminating the foregoing difficulties.

Another object of the present invention is to provide a simple, light weight, small, electric motor control system.

A further object is to provide an electric motor control system permitting adequate torque and flexibility from the motor.

To this end a system comprising a heavy duty multi-pole, multi-position switch, an auto-transformer, rectifiers, and a small D.-C. motor is used such that the motor can be controlled so as to rotate clockwise at full speed, to rotate clockwise at reduced speed, to stop, to rotate counter-clockwise at reduced speed, and to rotate counter-clockwise at full speed.

The above and other objects will be apparent from the following specification when taken with the accompanying drawing, the single figure of which is a schematic diagram of one form of the invention.

Referring to the drawing a motor control system is disclosed in which a five-pole switch 17 having five positions, A, B, C, D, and E, is used to connect an armature 11 of a D. C. motor to a bridge rectifier 18, and field winding 13 to a second bridge rectifier 19. Rectifiers 18 and 19 are energized by an A. C. input, applied at terminals 27 and 28, through auto-transformer 15 which has a lower voltage tap 16. The drawing shows the various circuit interconnections with switch 17 having its poles in the A position. Also shown are only the poles and contacts for the other four positions B, C, D, and E.

As will be shown in more detail the five positions of switch 17 produce connections to cause the armature 11 to rotate in the following ways: one position A causes clockwise rotation at full speed; another position E, opposite to position A, causes counter-clockwise rotation at full speed; a third position B, intermediate to positions A and E and adjacent to position A, causes clockwise rotation at a reduced speed; a fourth position D, opposite to position B, intermediate to positions A and E, and adjacent to position E, causes counter-clockwise rotation at the same reduced speed; and a fifth position C, intermediate and adjacent to positions B and D, causes the motor to stop.

Switch 17 has five poles 21, 22, 23, 24, and 25 all controlled by one toggle and each pole has associated with it two contacts of the spring leaf type. Pole 21 of switch 17 is connected in series with the primary circuit of auto-transformer 15 and causes it to be energized in positions A, B, D, and E. In the stop position C pole 21 is open and deenergizes all circuits.

Poles 22 and 23 provide the speed control feature of this invention. In position A the full secondary voltage of auto-transformer 15 is connected through poles 22 and 23 to the input of rectifier 18. In position E pole 23 alone provides the above connection. In positions B, C, and D the low voltage tap is connected to rectifier 18 through poles 22 and 23. Thus in positions A and E of switch 17 full voltage is applied causing full speed rotation of armature 11, and in positions B and D a lower voltage is applied causing a lower speed of rotation.

Poles 24 and 25 provide the reversing feature of this invention. In positions A and B poles 24 and 25 connect the output of rectifier 18 to armature 11 in one direction causing clockwise rotation. In positions D and E poles 24 and 25 connect the output of rectifier 18 to armature 11 in the opposite direction causing counter-clockwise rotation. In position C poles 24 and 25 are open.

The full secondary voltage of auto-transformer 15 is applied directly to the input of rectifier 19 the output of which is directly connected to field winding 13. Thus field winding 13 is energized with switch 17 in positions A, B, D, and E. In position C the magnetic field of winding 13 collapses through rectifier 19 and does not produce an arc at any of the switch contacts.

Mechanically switch 17 comprises five like units each unit having one movable pole and two spring leaf contacts and all five units being actuated by a common toggle. The toggle of switch 17 has five possible positions being at rest in the intermediate or neutral position C. The toggle can be moved against a light spring tension to either adjacent position B or D but will return to the neutral position C when released due to this spring tension. The toggle can further be moved to either next adjacent position A or E against a heavier spring tension and will lock into such position A or E requiring an external force to return it to its neutral position C or to positions B or D. Now, since positions A and E of switch 17 cause full speed rotation but in opposite directions, the above feature of the switch prevents an attempt to suddenly reverse the direction of rotation of the armature 11 when at full speed. The positions B and D are useful for angularly positioning the load connected to armature 11.

Rectifiers 18 and 19 for simplicity are of the bridge type and one embodiment of the invention uses selenium rectifiers. However, it is to be understood that any other type of rectifier may be used. Rectifiers 18 and 19 are selected so as to have ratings which meet the requirements of armature 11 and field 13 respectively. Autotransformer 15 is selected to have a secondary voltage, considering losses in rectifier 18, which will produce full speed rotation of armature 11. Its low voltage tap 16 is selected to provide the desired slow speed of rotation of armature 11. It is obvious that tap 16 might be made variable so as to provide a choice of lower speeds.

This system has the further advantages, when connected to and driving a radar spinner as used with one form of the invention, that it is simpler and lighter in weight than a comparable servo system, and that it has better starting torque and positioning control than a system using an induction motor.

The invention described in the foregoing specification need not be limited to the details shown, which are considered to be illustrative of one form the invention may take.

It is to be understood that any multi-poled, multi-position switch, having a toggle or other controlling device, and capable of providing substantially the same connections could likewise be used.

What is claimed is:

1. A motor control system comprising a direct-current motor provided with first and second armature terminals, a transformer having first and second input terminals adapted to be connected to a source of alternating current energy, said transformer being further provided with first, second and third output terminals, the output voltage between said first and third output terminals being greater than the output voltage between said first and second output terminals, a rectifier having first and second input terminals and first and second polarized output terminals, means connecting said first output terminal of said transformer to said first input terminal of said rectifier, a multi-poled, five position switch, said switch when in a first position connecting said third output terminal of said transformer to said second input terminal of said rectifier and said first and second output terminals of said rectifier to said second and first armature terminals, respectively, said switch when in a second position connecting said second output terminal of said transformer to said second input terminal of said rectifier and said first and second output terminals of said rectifier to said second and first armature terminals, respectively, said switch when in a third position completely disconnecting said armature terminals from said rectifier, said switch when in a fourth position connecting said second output terminal of said transformer to said second input terminal of said rectifier, and said first and second output terminals of said rectifier to said first and second armature terminals respectively, and said switch when in a fifth position connecting said third output terminal of said transformer to said second input terminal of said rectifier and said first and second output terminals of said rectifier to said first and second armature terminals, respectively, and means for energizing the field of said direct current motor with direct current.

2. A motor control system as in claim 1 wherein said means for energizing said field comprises a second rectifier having the input terminals thereof coupled to two output terminals of said transformer and having the output terminals thereof coupled to said field.

3. A motor control system as in claim 1 wherein said switch means disconnects at least one of said input terminals of said transformer from said source when said switch is in said third position.

4. A motor control system as in claim 1 wherein said switch is adapted to traverse said five positions only in the sequential order recited and in the opposite sequential order whereby abrupt reversals of said motor are prevented.

5. A motor control system comprising a direct current motor provided with first and second armature terminals and first and second field terminals, a transformer having first and second input terminals and first, second and third output terminals, a first rectifier having first and second input terminals connected to said first and third output terminals of said transformer and first and second polarized output terminals connected to said first and second field terminals respectively, a second rectifier having first and second input terminals and first and second output terminals, said first input terminal of said second rectifier being connected to said first output terminal of said transformer, a source of alternating current energy having first and second terminals, said first terminal of said source being connected to said first input terminal of said transformer, and a multi-poled five position switch, said switch when in said first, second, fourth and fifth positions connecting said second terminal of said source to said second input terminal of said transformer, said switch when in said first and fifth positions connecting said third output terminal of said transformer to said second input terminal of said second rectifier, said switch when in said second and fourth positions connecting said second output terminal of said transformer to said second input terminal of said second rectifier, said switch when in said first and second positions connecting said first and second output terminals of said second rectifier to said second and first armature terminals respectively, and said switch when in said fourth and fifth positions connecting said first and second output terminals of said second rectifier to said first and second armature terminals respectively.

6. A motor control system comprising a D.-C. motor, a five pole, five position switch and sources of D.-C. power for said motor, said sources comprising an auto-transformer having its primary energized by an A.-C. source of power through one pole of said switch, a first rectifier directly connecting the field winding of said motor to the secondary of said auto-transformer, and a second rectifier connecting the armature of said motor to said secondary through the remaining poles on said switch, said switch connecting said rectifier to a high voltage tap on said auto-transformer in two of said five positions and to a low voltage tap in two of said five positions, one position of said switch connecting the armature of said motor to a source of power causing clockwise rotation of said armature at full speed, another position, opposite to the aforesaid position, connecting said armature to the same source of power but in an opposite direction causing counterclockwise rotation of said armature at full speed, a third position, intermediate to the aforesaid positions and adjacent to the first mentioned position, connecting said armature to a lower voltage source of power causing clockwise rotation of said armature at a reduced speed, a fourth position, opposite to the aforesaid third position, intermediate to the first and second mentioned positions, and adjacent to the second mentioned position, connecting said armature to the same lower voltage source of power but in an opposite direction causing counterclockwise rotation of said armature at the same reduced speed, and a fifth position of said switch, intermediate and adjacent to the aforementioned third and fourth positions, disconnecting said motor from said sources of power causing said motor to stop.

7. A motor control system comprising a direct current motor provided with first and second armature terminals, a transformer having a primary adapted to be energized from a source of alternating current energy, said transformer being further provided with a first pair of output terminals providing a relatively high voltage and a second pair of output terminals providing a lower voltage, a rectifier circuit having input terminals and polarized output terminals, a multi-poled, five position switch, said switch when in a first position connecting the input terminals of said rectifier to said first pair of output terminals on said transformer and said first and second terminals on said armature to said output terminals of said rectifier in a first polarity, said switch when in a second position connecting said input terminals of said rectifier to said second pair of output terminals on said transformer and said first and second armature terminals to said output terminals of said rectifier in said first polarity, said switch when in a third position disconnecting said armature terminals from said rectifier, said switch when in a fourth position connecting said second pair of output terminals of said transformer to the input terminals of said rectifier and said first and second terminals of said armature to the output terminals of said rectifier in a second polarity, and said switch when in a fifth position connecting said first pair of output terminals of said transformer to the input of said rectifier and said first and second armature terminals to the output terminals of said rectifier in said second polarity, and means for energizing the field of said motor.

8. A motor control system comprising a direct current motor, a source of alternating current energy, a rectifier circuit having input terminals and polarized output terminals, a multi-poled, five position switch, said switch being adapted to traverse said five positions only in a direct and a reverse sequential order, said switch in the first and fifth positions coupling the input of said rectifier circuit to said source of alternating current energy and causing said source of alternating current energy to supply a relatively high voltage to said rectifier circuit, said switch when in the second and fourth positions coupling the input of said rectifier circuit to said source of alternating current energy and causing said source of alternating current energy to supply a relatively low voltage to said rectifier, said switch when in said first and second positions coupling the armature of said motor across said polarized output terminals of said rectifier in a first direction, said switch when in said fourth and fifth positions coupling said armature across said polarized output terminals of said rectifier in the opposite direction, said switch when in a third position disconnecting said armature terminals from said rectifier.

GLENN D. SHECKELS.

REFERENCES CITED

The following references are of record in the file of this patent:

UNITED STATES PATENTS

| Number | Name | Date |
|---|---|---|
| 911,013 | James | Jan. 26, 1909 |
| 921,642 | Darlington | May 11, 1909 |
| 1,027,072 | Schwieder | May 21, 1912 |
| 1,119,384 | Zimmer | Dec. 1, 1914 |
| 1,157,823 | Thomas | Oct. 26, 1915 |

FOREIGN PATENTS

| Number | Name | Date |
|---|---|---|
| 419,437 | Great Britain | Feb. 9, 1933 |